Figure 1:
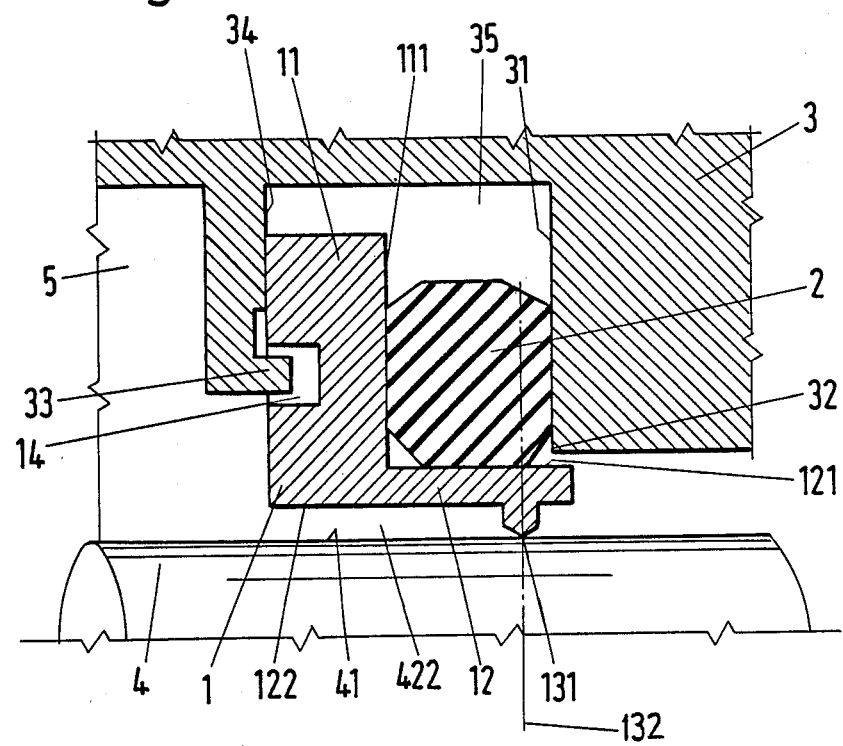

United States Patent [19]

Müller

[11] Patent Number: 4,889,349

[45] Date of Patent: Dec. 26, 1989

[54] SEALING ARRANGEMENT

[75] Inventor: Heinz K. Müller, Waiblingen, Fed. Rep. of Germany

[73] Assignee: Martin Merkel GmbH & Co KG, Hamburg, Fed. Rep. of Germany

[21] Appl. No.: 155,721

[22] PCT Filed: May 15, 1987

[86] PCT No.: PCT/EP87/00259

§ 371 Date: Jan. 14, 1988

§ 102(e) Date: Jan. 14, 1988

[87] PCT Pub. No.: WO87/06991

PCT Pub. Date: Nov. 19, 1987

[30] Foreign Application Priority Data

May 16, 1986 [DE] Fed. Rep. of Germany ....... 3616689

[51] Int. Cl.$^4$ ............................................. F16J 15/32
[52] U.S. Cl. ........................................ 277/85; 277/92; 277/173; 277/177
[58] Field of Search .................... 277/27, 74, 75, 81 R, 277/83, 85, 92, 173, 177, 59

[56] References Cited

U.S. PATENT DOCUMENTS

| | | |
|---|---|---|
| 3,384,382 | 5/1968 | Rink ................................. 277/34.3 |
| 3,443,814 | 5/1969 | Dahlheimer .......................... 277/27 |
| 4,053,166 | 10/1977 | Domkowski ........................ 277/152 |
| 4,243,233 | 1/1981 | Arai .................................. 277/81 P |
| 4,268,045 | 5/1981 | Traub ................................. 277/177 |
| 4,723,782 | 2/1988 | Muller ................................ 277/75 |

FOREIGN PATENT DOCUMENTS 3026063 2/1982 Fed. Rep. of Germany ........ 277/27

*Primary Examiner*—Frankie L. Stinson
*Attorney, Agent, or Firm*—Chilton, Alix & Van Kirk

[57] ABSTRACT

A seal comprised of a sealing ring (1) and a clamping ring (2) presses against the end face (31) of a machine part (3). The sealing ring surrounds a tubular part (12), close to the low-pressure end of which are formed a narrow sealing ridge (131) and a support part (11). The axial thrust exerted on the sealing ring (1) is transferred essentially by the support part (11) via the elastomer clamping ring (2) to the end face (31), so that the sealing ring (11) can yield in a floating manner against radial movements of the opposite operating surface. The pressure to be sealed off acts both via the clamping ring (2) on the one side and, an annular groove (422) on the other side of the tubular part (12), so that the sealing surface is essentially relieved of its load.

22 Claims, 3 Drawing Sheets

SEALING ARRANGEMENT

The invention relates to a sealing arrangement consisting of a sealing means, a first machine part (for example, a sealing housing or piston) separating a space of higher pressure from a space of lower pressure and forming, to receive the sealing means, an annular space which is limited, towards the space of lower pressure, by an end face supporting the sealing means, and of a second machine part (for example, a cylinder or rod) forming an opposing surface interacting with the sealing means and movable in rotation and/or axially, the sealing means, which encloses a gap together with the opposing surface, comprising a sealing ring made of flexible material, which, on a tubular sealing-ring part, forms a sealing edge projecting relative to the opposing surface, a supporting part, which supports the tubular sealing-ring part on the side of higher pressure, and a tension ring made of elastic material, which touches the tubular sealing-ring part and is subjected to the higher pressure and which rests against the end face of the annular space.

In sealing means, a high specific frictional capacity related to the sliding sealing surface, which occurs in the sealing gap between the sliding sealing surfaces, can be converted into heat under the influence of high pressure to be sealed off and at a high peripheral speed of the shaft forming the opposing surface. If as little leakage as possible is to be ensured, the width of the sealing gap must be of the order of magnitude of the roughness of the surfaces of the sealing ring and of the shaft which form the gap. Mixed friction usually occurs here. In a sealing ring made of low-wear plastic based on polytetrafluoroethylene, a coefficient of friction of approximately 0.05 must be expected under high surface pressure and with mixed friction. Because the curve of the pressure drop in the sealing gap cannot be defined where mixed friction is concerned, a shaft seal subject to radial pressure must be designed so that the sealing-surface pressure is at least as high as the pressure to be sealed off. Under these conditions, for example, even at a pressure of only 5 MPa and with a shaft diameter of 80 mm and a rotational speed of 1500 revolutions per minute, a specific frictional capacity of at least 150 Watts per square centimeter of the sealing surface is obtained. As a comparison, the specific heating capacity of an electrical cooking plate amounts to only approximately 8 Watts per square centimeter. The elimination of the frictional heat is therefore an important object.

However, in conventional shaft seals with a sealing edge of small axial extent, which is subjected to radial pressure, the actual frictional capacity is usually even substantially higher than the value calculated above, because, since there is an insufficient hydrostatic relief of the sealing edge, the sealing-surface pressure is generally substantially higher than the pressure to be sealed off and is therefore too high in sealing terms. The result of this is that such shaft seals with plastic sealing rings cannot be used under the operation conditions assumed above, because of the danger of overheating of the sealing surfaces.

Furthermore, with conventional sealing rings used for sealing off higher pressures, there is excessive flattening of the sealing edge and consequently an undesirable enlargement of the sealing surface because of too high a radial force, with the result that, for this reason too, an extremely high frictional capacity is obtained, at the same time with unfavorable conditions for heat elimination. The generation of heat in the sealing gap therefore often causes the failure of shaft seals and limits the range of use in terms of pressure and peripheral speed.

In the known sealing arrangement described in the introduction (DE-C-3,217,118, especially FIGS. 1 and 5), the fraction of the sealing-surface pressure originating from the pressure to be sealed off is kept small because the sealing edge is arranged near the low-pressure end of the tubular sealing ring and the latter is supported, right up to the annular projection forming the sealing edge, by a supporting ring which consists, for example, of metal and which absorbs the radial force of the tension ring transmitting pressure to be sealed off to the sealing ring, the sealing ring being supported directly on the low-pressure end face of the annualar space receiving it. The disadvantage of this arrangement is that the sealing ring rests against the end face under friction and can therefore follow the unavoidable dynamic eccentricity of the shaft only to a restricted extent, thus leading to the formation of an enlarged sealing gap and consequently to increased leakage. Another disadvantage is that, because of the bending resistance of the supporting ring, during assembly the sealing means cannot be introduced, folded together, into the annual space receiving it, and that the housing forming the annular space consequently has to have a split design.

The object on which the invention is based is, therefore, to provide a sealing arrangement of the type mentioned in the introduction, in which the frictional capacity is effectively limited, but the sealing ring is movable radially.

In the solution according to the invention, the supporting part is connected to the thin-walled tubular sealing-ring part at a distance from the sealing edge and interacts with the tension ring via an end face for transmitting the axial thrust, the space of higher pressure being in communication both with the peripheral surface of the tension ring and with a gap between the tubular sealing-ring part and the opposing surface.

The sealing ring is supported axially, via the end face, on the tension ring which is made of elastomeric material and which acts at the same time as a secondary sealing means.

The tension ring is preferably oversized in relation to the peripheral surface of the tubular part against which it rests, so that it can exert a sufficient sealing effect even in the pressureless state. Both the axial thrust of the supporting part exerted on the tension ring and the pressure of the medium to be sealed off, exerted directly on part of the surface of the tension ring, bring about, int the tension ring, a hydrostatic compressive-stress state which leads to an additional radial pressure force on the tubular part resulting in an increase in the sealing-surface pressure. Up to the sealing edge, the tubular part is subjected to the pressure to be sealed off, from the side facing the opposing surface also, as a result of which the pressure forces exerted on the tubular part radially form inside and outside are partially cancelled, in particular essentially those pressure forces which, on the pressure side, act radially on the sealing means in front of the plane formed by the sealing edge. By determining the axial position of the sealing edge on the tubular part, the designer is thus able to determine, as desired, the remaining fraction, originating edge from the pressure to be sealed off, of the radial pressing force exerted by the sealing edge on the opposing surface. As a result of the radial pressing force of the sealing edge on the opposing surface, the sealing edge is flattened and forms a contact surface of small axial width together with the opposing surface. The flattening of the sealing edge and consequently the size of the frictional surface is the lesser, the lower the radial force pressing the sealing edge against the shaft. So that, in the arrangement according to the invention, the resulting pressing force is limited to the least possible amount necessary for sealing purposes, the frictional capacity is also reduced in two respects, in particular first by the reduction in the size of the frictional surface because of less flattening of the sealing edge, and second by the reduction in the surface pressure taking effect in the frictional surface.

The radial movability of the sealing ring in the region of the sealing edge in order to compensate the dynamic eccentricity of the rod becomes possible because the sealing ring consisting of relatively rigid material is supported on the housing and especially the end face of the installation space not directly and rigidly, but, as it were, in a floating manner via the tension ring made of softer material. This effect is put to best use when, in the operating state, the sealing ring is connected to the first machine part in a force-transmitting manner solely via the tension ring and is otherwise completely free from the first machine part, and when the tension ring is likewise radially movable, in such a way that is does not touch the first machine part on its peripheral surface facing away from the tubular part. If further axial support is nevertheless still provided, this should be elastically flexible at least in the radial direction, so as not to impair the relative movability of the sealing means and impede the access of the pressure to be sealed off to the tension ring. Exceptionally, an axial stop, rigid if appropriate, can be provided between the sealing means and the first machine part, in such a way that it takes effect only under the influence of extreme pressure differences, to avoid the danger of excessive deformation of the sealing means.

The term "supporting part" must be interpreted in the light of its function of supporting the sealing ring on the tension ring. This term therefore includes all those parts of the sealing ring which form an end face suitable for providing supporting contact with the tension ring.

In contract to the known sealing means explained above, the supporting part does not have to be a ring separate from the sealing ring, but appropriately is made in one piece with this. It can be formed by a flange-like thickened portion which gives it a desired rigidity and which forms an end face supported on the tension ring.

Because the tubular part is thin-walled, it has as large an installation tolerance as possible, that is to say it yields to difference diameters of the opposing surface as a result of deformation, without an unacceptable increase in the prestress taking effect in the sealing surface. The lower the expected insulation tolerance, the thicker the tubular part can be made. The thin-walled characteristic of the tubular part can also be advantageous in terms of the flexibility of the sealing edge in relation to especially high-frequency radial movement of the opposing surface.

The tubular part is preferably cylindrical. At the same time, its wall thickness outside the region of the sealing edge is preferably less than 1 mm, whereas at the location of the sealing edge it can amount to between 1 and 3 mm. A particular advantage of the thin-walled characteristic of the tubular part in the region of the sealing edge is that that fraction of the axial thrust which is exerted on the sealing ring in this axially unsupported region by the pressure to be sealed off and which is to be transmitted to the tension ring becomes as small as possible. In another advantageous design, the diameter of the tubular part decreases towards its free end, especially in conical form, the transition edge between its inner face and its low-pressure end face forming the sealing edge.

Appropriately, the sealing-edge plane, that is to say the play perpendicular to the axis and passing through the sealing edge, is arranged near the end face of the annular space receiving the sealing means, so that the axial distance between the sealing-edge plane and the supporting part is greater than the axial distance between the sealing-edge plane and the said end face. Thus, the pressing effect of the pressure to be sealed off on the sealing edge can be reduced so that the remainder, together with the oversize prestress of the sealing edge and of the tension ring, is just sufficient to ensure reliable sealing. It can happen, in this case, that the tubular part extends beyond the plane of the end face on the low-pressure side. Under these circumstances, it is necessary to ensure that the diameters of the first machine part and of the tubular part are coordinated with one another in order to prevent mutual contact.

The relative position of the sealing edge in relation to the supporting end face of the installation space can be influenced not only by the distance between the sealing-edge plane and the supporting part, but also by the choice of cross-sectional shape and axial dimension of the tension ring. Furthermore, the axial flexibility of the tension ring can be set by selecting its cross-sectional shape and its material in such a way that, under increasing pressure, the sealing ring and consequently the position of the sealing-edge plane shift axially relative to the supporting end face, so that the sealing surface is thereby further relieved in a desirable way under high pressure, for the purpose of minimizing the frictional capacity, and the pressing force does not exceed the amount necessary in sealing terms. Conventional elastomeric seals, O-rings, X-rings, quad rings or the like are preferably used as tension rings.

In order to ensure the function of the tension ring as a secondary sealing means even in the state of assembly and also without the effect of a pressure difference to be sealed off, the tension ring is appropriately clamped between the supporting part and the end face of the annular space by means of a prestressing spring, as a result of which it comes sealingly up against the end face of the annular space. The prestressing spring can be formed by the tension ring itself if the axial installation length of the annular space is less than the relaxed length of the sealing means. At the same time, on the high-pressure side, the sealing ring rests against an end face connected to the first machine part, the tension ring being clamped axially elastically between the end face of the supporting part and the low-pressure end face of the annular space. If the pressure of the fluid to be sealed off takes effect additionally, the axial thrust arising thereby causes axial deformation of the tension ring, with the result that the sealing ring lifts off from the bearing surface located on the pressure side and is now free for the desired movability.

The sealing means according to the invention can be used for rotating shafts, for axially moved rods and for machine parts with a combined type of movement, the first machine part being formed by a housing and the second part by the shaft or rod. Conversely, the sealing means can also be installed in an inner machine part, especially a piston, and ensure sealing relative to a peripheral surface surrounding it.

The object according to the invention, to free the sealing ring or its essential parts from any contact with the surrounding housing which limits its radial movability, also applies to the tension ring with only certain restrictions. This is to have enough freedom to allow it to change position relative to the end face supporting it in response to an eccentricity of the opposing surface which is static, that is to say unchanged during operation, whilst, as a result of its friction on the end face, it is substantially fixed relative to a dynamic radial movement of the opposing surface. The supporting part of the sealing ring does not necessarily have to participate in the clamping of the sealing ring to ensure the initial sealing, since, in an advantageous embodiment, this clamping can also be effected by means of an end face of the first machine part, this end face being located opposite the supporting end face and appropriately being conical, the space enclosed between the two end faces and a tension ring appropriately communicating with the space of higher pressure via ducts. This is not necessary if the tension ring and the distance between the end faces are such that the tension ring is lifted off from the high-pressure end facing during operation.

To prevent the sealing means from rotating together with the second machine part, a known rotation prevention means can be provided. For this purpose, at least two projections engaging with play into corresponding recesses in the sealing ring are preferably made on the first machine part.

So that, where a shaft is concerned, the frictional heat is eliminated effectively from the sealing surfaces at as low a temperature as possible, elements can be formed on the sealing means in a way known per se and bring about an intensive fluid flow and fluid exchange at the sealing surfaces or at the surfaces adjacent to these. Appropriately, this can be ensured if, in a part region between the supporting part of the sealing ring and the opposing surface, the gap is smaller than the gap between the tubular part and the opposing surface, the sealing ring containing, in the region of the narrower gap, several grooves arranged obliquely relative to the axis of rotation and alternately ascending to the right and ascending to the left, so that, during the rotation of the opposing surface, as a result of the drag flow there is an alternating inflow and flow-off of fluid to be sealed off into and from the annular space which is directly adjacent to the sealing surfaces and which is formed by the gap between the tubular part and the opposing surface. Irrespective of the type of movement of the opposing surface, the sealing edge is appropriately designed so that, in longitudinal section, the angle between the generatrix forming the part of the sealing edge located on the high-pressure side and the opposing surface is larger than the angle between the generatrix forming the part of the sealing edge located on the low-pressure side and the opposing surface.

Figure 2:
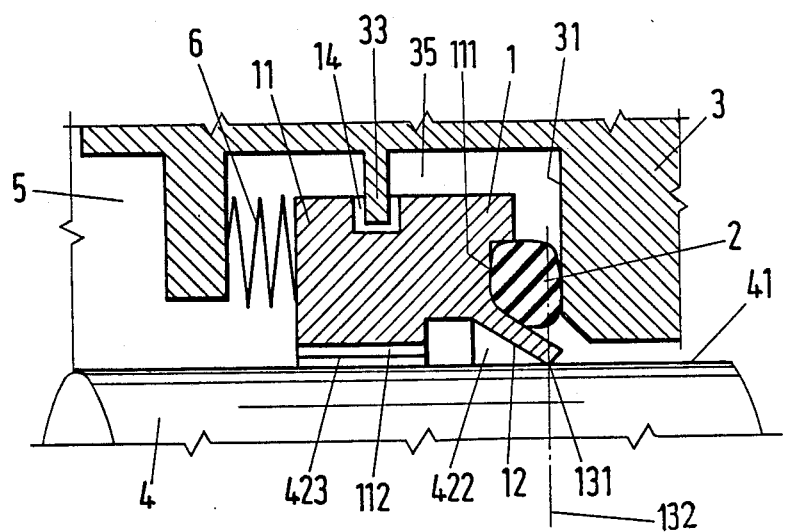
Figure 3A:
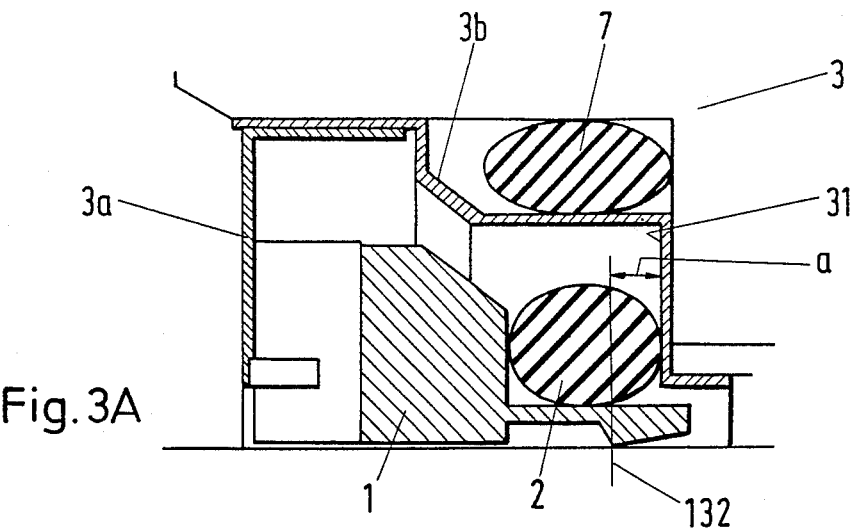
Figure 3B:
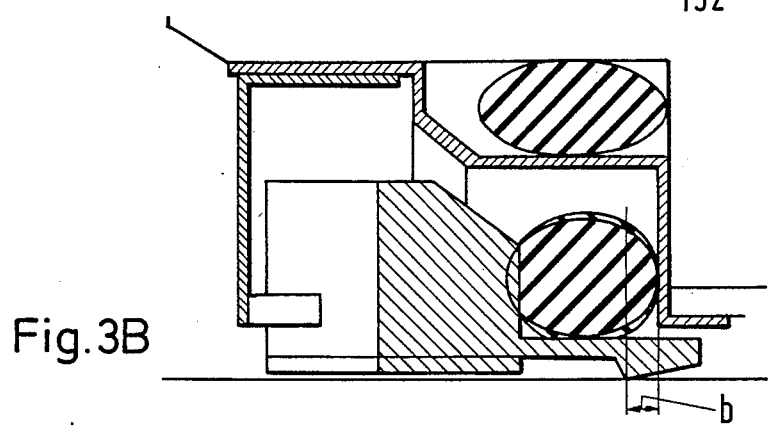
Figure 3C:
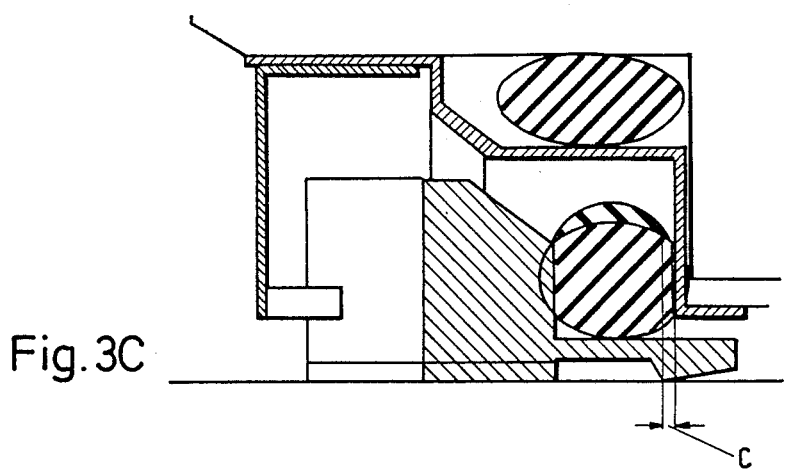
Figure 4:
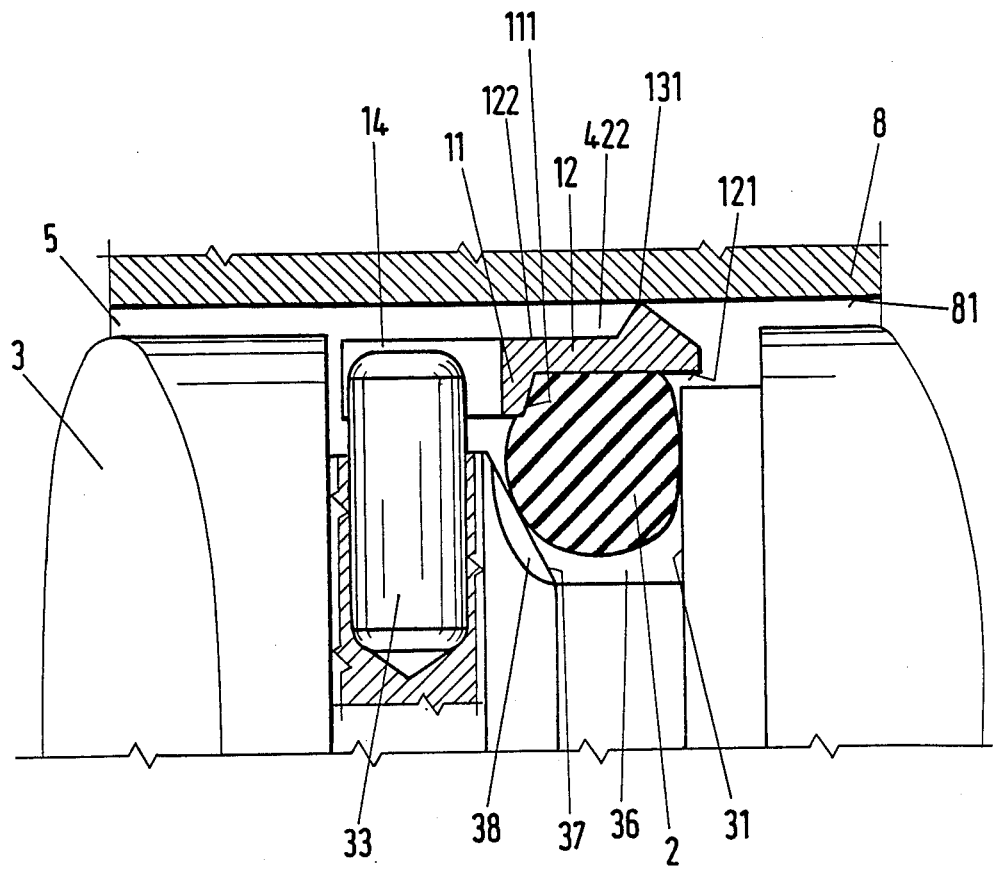

The invention is explained in detail below with reference to the drawing which illustrates diagrammatically advantageous exemplary embodiments and in which:

FIG. 1 shows a first embodiment of a shaft seal or rod seal with a cylindrical tubular part, FIG. 2 shows a shaft seal or rod seal with a conical tubular part, FIGS. 3A to 3C show a second embodiment of a shaft seal or rod seal with a cylindrical tubular part in three different operating phases, and FIG. 4 shows a piston seal.

FIG. 1 shows a sealing arrangement according to the invention with the sealing ring 1 consisting of the supporting part 11 and of the cylindrical tubular part 12 connected in one piece with this. The sealing ring consists of viscoplastic or rigid plastic, such as modified polytetrafluoroethylene. Arranged round the tubular part 12 is the tension ring 2 which is made of elastomeric material substantially softer than that of the sealing ring. It is clamped in the housing 3 forming the first machine part, between the end face 111 of the supporting part 11 and the radial end face 31 of the annular space 35 receiving the sealing means, because, in the pressureless assembly state shown, the supporting part 11 rests against the high-pressure end face 34 of the annular space 35 which is located opposite the end face 31. The tubular part 12, on its side facing the shaft 4, has, near its end located on the low-pressure side, an annular projection forming the sealing edge 131 which is pressed against the shaft surface 41 forming the opposing surface. Pressing arises as a result of an undersize of the sealing ring in relation to the shaft surface 41 and/or a prestress of the tension ring 2. Between the tubular part 12 and the supporting part 11, on the one hand, and the shaft 4, on the other hand, there is a gap 422 which is limited on the low-pressure side by the sealing edge 131. The pressure in the space 5 of higher pressure takes effect in the gap 422 and loads the tubular part 12 from inside. Furthermore, the pressure of the fluid to be sealed off is exerted from outside on the tension ring 2, by means of which the pressure is propagated and transmitted to the outer surface of the tubular part 12.

The radial force acting between the sealing edge 131 and the shaft surface 41 is mainly composed of two components, namely first the prestressing force, arising during the initial widening of the sealing edge by an amount corresponding to the production oversize relative to the shaft diameter, and the prestressing force of the tension ring 2, and second the difference between the pressure forces exerted on the tube from outside and from inside. Since the low pressure takes effect in the narrow annular region between the sealing-edge plane and the end face 31 and only in this region are the pressures exerted on the tubular part 12 radially from outside and from inside not compensated, only the pressure difference taking effect in this region determines the second force component mentioned. More details are explained further below with reference to FIG. 3.

It becomes clear from an examination of FIG. 1 that the sealing means consisting of the sealing ring 1 and the tension ring 2 is arranged in the housing 3 in a floating manner so as to be substantially freely movable, as soon as it has come away from the end face 34 under the effect of the differential pressure and can therefore yield to both static and dynamic radial movements of the shaft 4. Apart from inertia forces, only the very slight elastic forces of the tension ring 2 can oppose such a compensating movement. It may be noted, in this respect, that that portion 121 of the tubular part 12 which penetrates into the bore 32 of the housing 3 has a diameter which is so much less than that of the bore 32 that sufficient radial movability of the sealing ring 1 becomes possible. To prevent the sealing ring from being rotated itself, projections 33 connected to the housing 3 engage into recesses 14 in the sealing ring 1.

FIG. 2 shows a sealing arrangement according to the invention, the sealing ring 1 of which consists of the supporting part 11 and of a conical tubular part 12 made in one piece of plastic. The tension ring 2 is clamped between the end face 111 of the supporting part and the end face 31 of the annular space 35 receiving the sealing means, because the supporting part is loaded by a prestressed spring 6 on its side facing the space 5 of higher pressure. The sealing edge 131 of the tubular part 12 is formed by the transition edge from its inner face and its end face. Between the tubular part and the shaft 4 there is a gap 422, in which the fluid to be sealed off, contained in the space 5 of higher pressure, penetrates up to the sealing edge and by means of its pressure loads the tubular part from inside. Furthermore, the pressure of the fluid to be sealed off is exerted from outside on the tension ring 2 made of elastomeric material, by means of which the pressure is propagated and thereby transmitted to the outer surface of the tubular part 12 against which the tension ring rests. Between a portion of the supporting part 11 and the shaft surface, the gap 423 is narrowed and the surface of the supporting part contains grooves 112 extending obliquely relative to the shaft axis. To prevent the sealing ring from being rotated itself, projections 33 connected to the housing 3 engage into recesses 14 in the sealing ring.

According to FIGS. 3A to C, the sealing means formed by the sealing ring 1 and the tension ring 2 is contained, as a sealing unit, ready for installation, in a sealing housing which is formed by two sheet-metal parts 3a and 3b pressed into one another and which is inserted into a corresponding bore in the housing 3. The sealing housing 3a, 3b is sealed off relative to the housing by means of an elastomeric O-ring 7.

FIG. 3A shows the arrangement in the pressureless assembly state. The sealing ring 1 rests against the sheet-metal part 3a, the dimensions being selected so that the tension ring 2 is prestressed slightly both radially and axially. The sealing-edge plane 132 is at a distance a from the end face 31. FIG. 3B shows an operating state in which the fluid to be sealed off has a medium pressure. The sealing ring has moved away from the sheet-metal part 3a and, as a result of the axial thrust exerted on it by the higher pressure, compresses the tension ring 2 to a greater extent. The sealing-edge plane has consequently shifted, and its distance b from the end face 31 is now less than the value a in the pressureless state. Consequently, the component, generated by the pressure to be sealed off, of the radial force exerted on the sealing edge is less than that which would arise under the same pressure, but with the sealing ring having an axially rigid mounting. Finally, FIG. 3C shows the state under a high pressure to be sealed off. The tension ring 2 is compressed even further, and the sealing-edge plane has shifted even further towards the low-pressure side with a relieving effect, so that $c < b < a$.

FIG. 4 shows a sealing means which is arranged in the piston 3 as a first machine part and which is formed by the sealing ring 11, 12 and the tension ring 2. In relation to the examples explained above, the supporting part 11 of the sealing ring is reduced in the radial direction. This is possible because there is scarcely any need for a radial supporting effect owing to the equalization of the pressures exerted on the sealing ring on the inside and on the outside. It is sufficient for the end face 111 of the supporting part 11 to have a radial extension which ensures that the sealing ring can still be supported sufficiently in the axial direction on the tension ring 2.

In the pressureless assembly state, the tension ring 2 is clamped between the end face 31 of the installation space 36 and the conical end face 37 located opposite it and the inner face 121 of the tubular part 12, in such a way that sufficiently leak-proof contact on the end face 31 and the inner face 121 of the tubular part 12 is obtained. So that, the higher pressure can also reach the inner peripheral surface of the tension ring 2 in the space 36 limited by the end faces 31, 37 and the tension ring 2, ducts 38 are provided. The sealing ring is secured against rotation in the piston 3 by means of a pin 33 which engages into a recess 14 in the supporting part 11. The opposing surface 81 of the arrangement is formed by a cylinder 8 which here forms the second machine part. Otherwise, as regards the design and functioning of this arrangement, the description of FIG. 1 can be referred to, the same reference numerals being used.

I claim:

1. In a sealing arrangement including a sealing means, a first machine part (3) separating a space (5) of higher pressure from a space of lower pressure and forming, to receive the sealing means, an annular space (35) which is limited, on the low-pressure side, by an end face (31) of the first machine part for supporting the sealing means, and a second machine part (4, 8) which forms an opposing surface that is movable relative to the sealing means, the sealing means together with the opposing surface (41) enclosing an annular gap (422), the sealing means that comprises:

a sealing ring (1) made of flexible material, which has a thin walled tubular sealing-ring part (12), a sealing edge (131) projecting from the seal ring part toward the opposing surface, a supporting part (11), which supports the tubular sealing-ring part (12) on the side of higher pressure, and a tension ring (2) made of elastic material, which bears against the tubular sealing-ring part (12) and is subjected to the pressure of said space of higher pressure and which rests against the end face (31) of the annular space (35), wherein the supporting part (11) is connected to the tubular sealing-ring part (12) at a distance from the sealing edge (131) and interacts with the tension ring via a sealing ring end face (111) for transmitting thrust toward the tension ring upon pressurization of the higher pressure space, the space (5) of higher pressure being in communication both with the peripheral surface of the tension ring (2) opposite the second machine part and with the gap (422) between the tubular sealing-ring part (12) and the opposing surface (41).

2. A sealing arrangement as claimed in claim 1, wherein, in the operating state, the sealing ring (1) is connected in a force-transmitting manner to the first machine part (3) solely via the tension ring (2).

3. A sealing arrangement as claimed in claim 2, wherein the tension ring (2) is clamped between the supporting part (11) and the end face (31) of the annular space (35) by means of a prestressing spring (6).

4. A sealing arrangement as claimed in claim 2, wherein the perpendicular distance between a plane passing through said sealing edge and tension ring and the end face (111) of the supporting part (11) is greater than the perpendicular distance between said plane (132) and the end face (31) of the annular space (35).

5. A sealing arrangement as claimed in claim 1, wherein the tension ring (2) is clamped between the supporting part (11) and the end face (31) of the annular space (35) by means of a prestressing spring (6).

6. A sealing arrangement as claimed in claim 5, wherein the axial distance between the sealing-edge plane (132) and the end face (111) of the supporting part (11) is greater than the distance between the sealing-edge plane (132) and the end face (31) of the annular space (35).

7. A sealing arrangement as claimed in claim 5, wherein the diameter of the tubular sealing-ring part (12) decreases towards its free end.

8. A sealing arrangement as claimed in claim 7, wherein the sealing edge (131) is formed by the edge between the inner face and the low-pressure face of the tubular sealing part (12).

9. A sealing arrangement as claimed in claim 5, wherein the prestressing spring (6) is formed by the tension ring (2) because the axial installation length of the annular space (35) is less than the relaxed length of the sealing means.

10. A sealing arrangement as claimed in claim 9, wherein the axial distance between the sealing-edge plane (132) and the end face (111) of the supporting part (11) is greater than the distance between the sealing-edge plane (132) and the end face (31) of the annular space (35).

11. A sealing arrangement as claimed in claim 1, wherein the perpendicular distance between a plane passing through said edge and tension ring and the end face (111) of the supporting part (11) is greater than the perpendicular distance between said plane (132) and the end face (31) of the annular space (35).

12. A sealing arrangement as claimed in, claim 1 wherein the tension ring (2) is an elastomeric sealing ring which, in the assembled pressureless state, rests with prestress against the tubular sealing-ring part (12).

13. A sealing arrangement as claimed in, claim 1 wherein the tubular sealing-ring part (12) is cylindrical.

14. A sealing arrangement as claimed in, claim 1 wherein the diameter of the tubular sealing-ring part (12) decreases towards its free end.

15. A sealing arrangement as claimed in claim 14, wherein the sealing edge (131) is formed by the edge between the inner face and the low-pressure end face of the tubular sealing-part (12).

16. A sealing arrangement as claimed in, claim 1 wherein the annular space (35) receiving the sealing means has an end face (37) which is located opposite the end face (31) on the low-pressure side and which, in the pressureless state, clamps the tension ring (2) against the end face (31) located on the low-pressure side.

17. A sealing arrangement as claimed in claim 16, wherein the end face (37) located opposite the end face (31) on the low-pressure side is conical.

18. A sealing arrangement as claimed in claim 17, wherein the space (36) is limited by the two end faces (31, 37) and the tension ring (2) and is in communication with the space (5) of higher pressure.

19. A sealing arrangement as claimed in claim 16, wherein the space (36) is limited by the two end faces (31, 37) and the tension ring (2) and is in communication with the space (5) of higher pressure.

20. A sealing arrangement as claimed in, claim 1 wherein the sealing ring (1) has fluid-conveying elements (112) on its surface located opposite the opposing surface (41).

21. The sealing arrangement of claim 1, wherein the peripheral surfaces of the tension ring and supporting part opposite the second machine part are exposed to the pressure of the higher pressure space and are free from contact with the first machine part, whereby the supporting part and tension ring can move together away from the second machine part independently of the first machine part.

22. The sealing arrangement of claim 1, wherein the peripheral surface of the supporting part opposite the second machine part is exposed to the pressure of the higher pressure space and is free from contact with the first machine part, whereby the supporting part can move away from the second machine part independently of the first machine part.

* * * * *

UNITED STATES PATENT AND TRADEMARK OFFICE
CERTIFICATE OF CORRECTION

PATENT NO. : 4,889,349
DATED : December 26, 1989
INVENTOR(S) : Heinz K. Muller

It is certified that error appears in the above-identified patent and that said Letters Patent is hereby corrected as shown below:

Column 9, line 3 of claim 11, insert --sealing-- before "edge".

Signed and Sealed this

Twenty-first Day of July, 1992

Attest:

DOUGLAS B. COMER

*Attesting Officer*   *Acting Commissioner of Patents and Trademarks*